United States Patent
Kimmel

(10) Patent No.: US 7,714,801 B2
(45) Date of Patent: May 11, 2010

(54) FOLDABLE ELECTRONIC DEVICE AND A FLEXIBLE DISPLAY DEVICE

(75) Inventor: Jyrki Kimmel, Tampere (FI)

(73) Assignee: Nokia Corporation, Espoo (FI)

( * ) Notice: Subject to any disclaimer, the term of this patent is extended or adjusted under 35 U.S.C. 154(b) by 936 days.

(21) Appl. No.: 11/030,570

(22) Filed: Jan. 5, 2005

(65) Prior Publication Data
US 2006/0146488 A1 Jul. 6, 2006

(51) Int. Cl.
*G09G 5/00* (2006.01)
*G09G 3/34* (2006.01)

(52) U.S. Cl. .................. 345/1.3; 345/108; 345/903; 349/58

(58) Field of Classification Search .......... 345/1.3, 345/4, 169, 173, 156, 903, 108; 349/58; 361/681
See application file for complete search history.

(56) References Cited

U.S. PATENT DOCUMENTS

| | | | |
|---|---|---|---|
| 4,948,232 A | 8/1990 | Lange | |
| 6,016,176 A | 1/2000 | Kim et al. | |
| 6,144,550 A | 11/2000 | Weber et al. | |
| 6,262,785 B1 | 7/2001 | Kim | |
| 6,311,076 B1 | 10/2001 | Peuhu et al. | |
| 6,377,324 B1 | 4/2002 | Katsura | |
| 6,577,496 B1 | 6/2003 | Gioscia et al. | |
| 6,771,232 B2 | 8/2004 | Fujieda et al. | |
| 6,988,247 B2 * | 1/2006 | Janevski .............. | 345/169 |
| 7,095,387 B2 * | 8/2006 | Lee et al. ............ | 345/4 |
| 2002/0090980 A1 | 7/2002 | Wilcox et al. | |
| 2004/0052044 A1 | 3/2004 | Mochizuki et al. | |
| 2004/0061683 A1 | 4/2004 | Mochizuki et al. | |
| 2004/0159710 A1 | 8/2004 | Silverbrook | |
| 2006/0050059 A1 * | 3/2006 | Satoh et al. ............ | 345/173 |

FOREIGN PATENT DOCUMENTS

| | | |
|---|---|---|
| CN | 1247618 | 3/2000 |
| EP | 0424074 | 4/1991 |
| WO | WO 2004/001704 | 12/2003 |
| WO | WO 2004/047059 | 6/2004 |

\* cited by examiner

*Primary Examiner*—Kevin M Nguyen
(74) *Attorney, Agent, or Firm*—Alfred Fressola; Ware, Fressola, Vand Der Sluys & Adolphson LLP

(57) ABSTRACT

An electronic device, which comprises: at least two parts foldable in relation to each other, which can be turned into a first position and into a second position around a rotation axis; and a flexible display device, which extends over at least two foldable parts, covering them either entirely or partly. The flexible display device comprises: a folded position, to which the display device settles in the first position, and in which it folds around a first direction, which is parallel in relation to the rotation axis; and a curved position, to which the display device settles in the second position, and in which it curves around a second direction, which is transverse in relation to the rotation axis. A flexible display device can also be used with an electronic device.

20 Claims, 6 Drawing Sheets

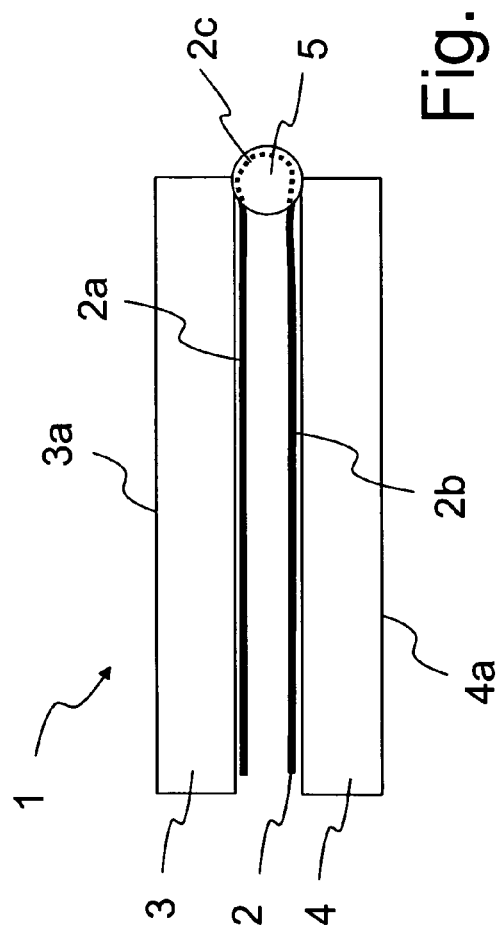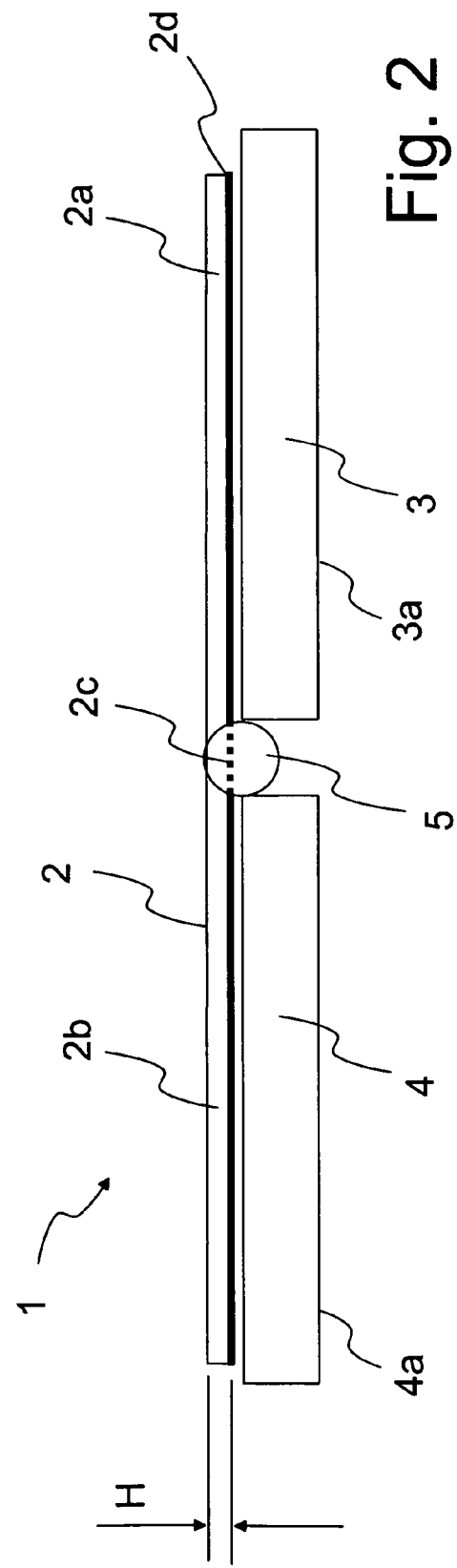

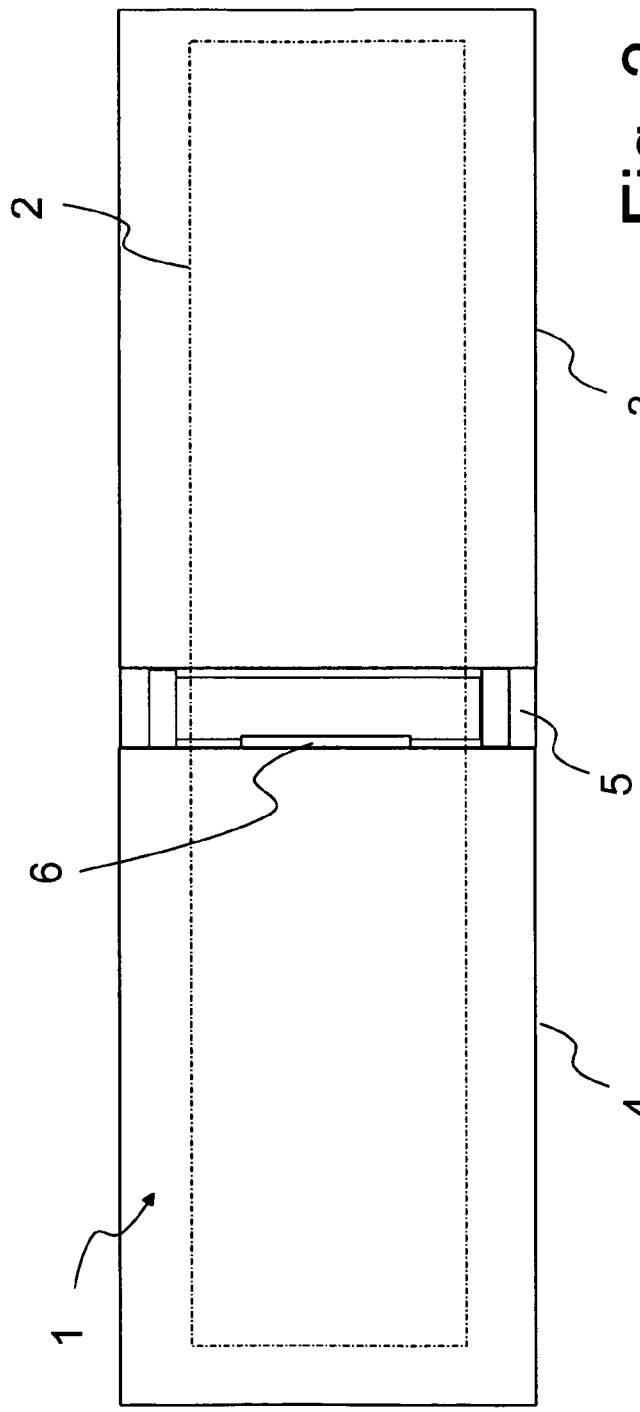
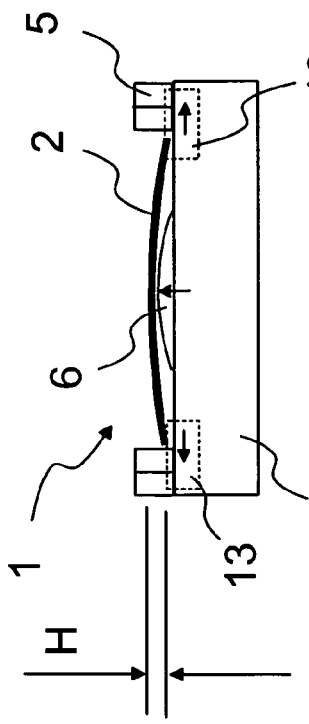
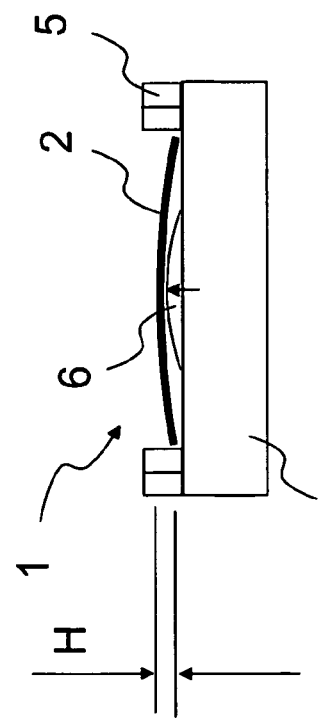

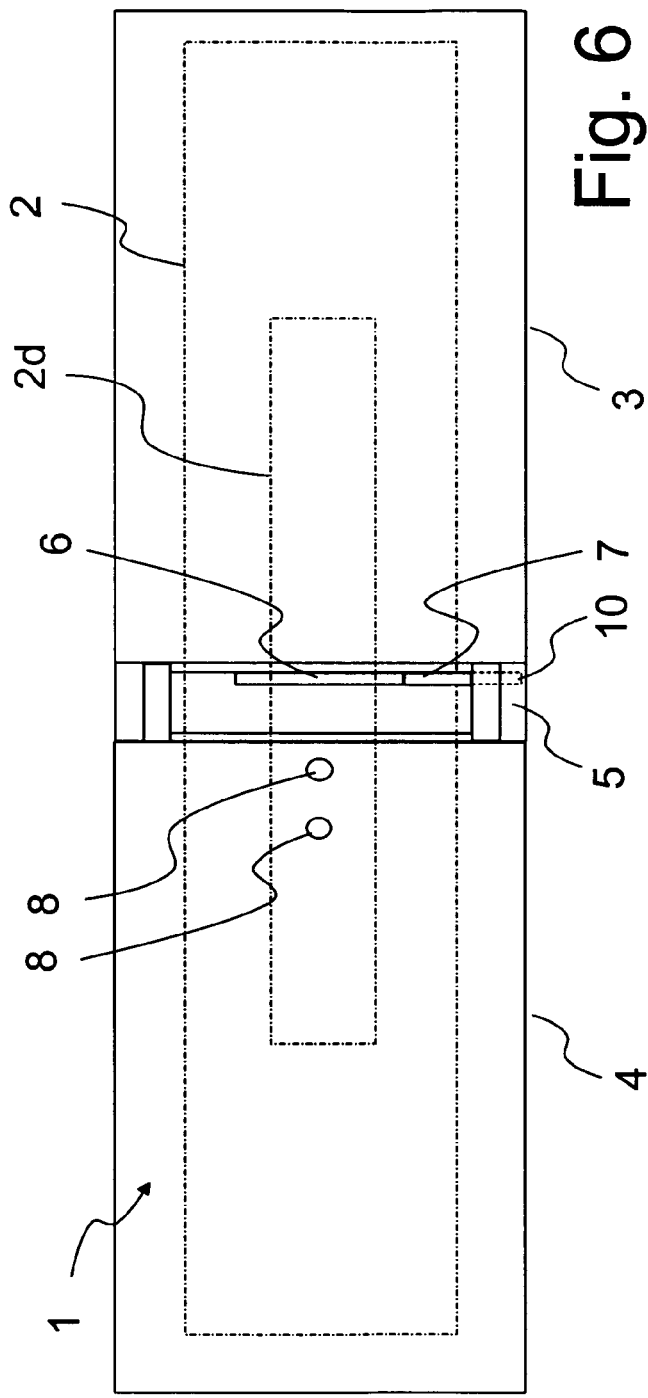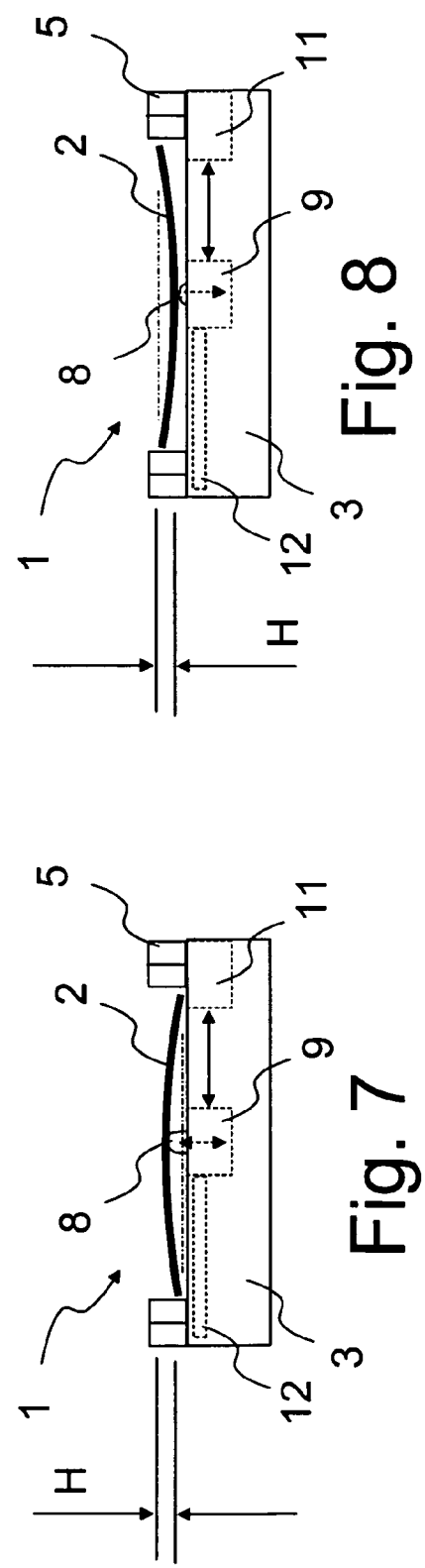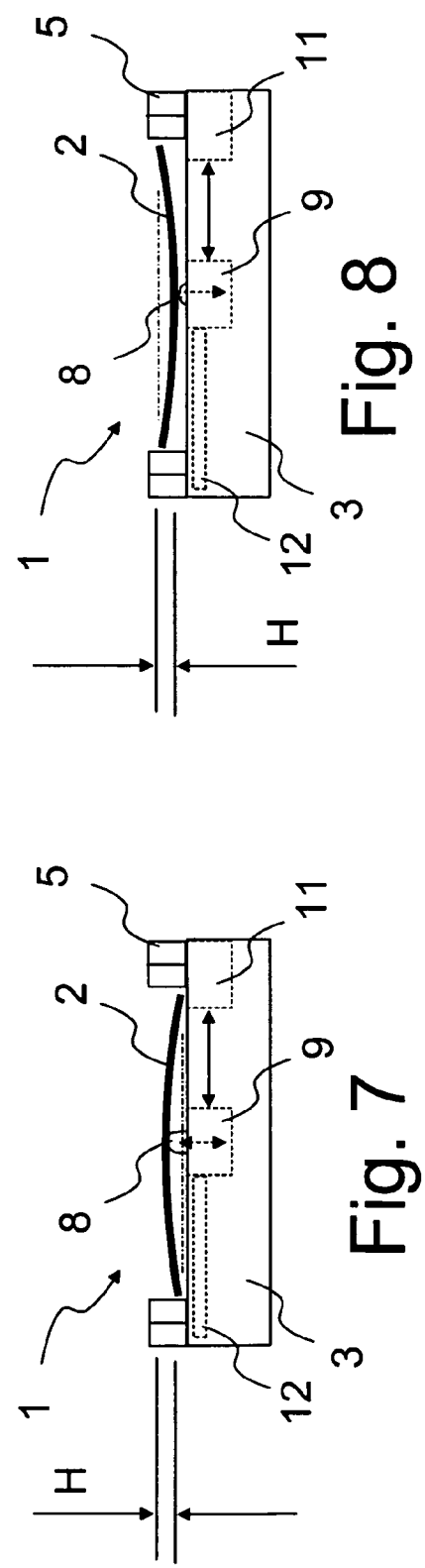

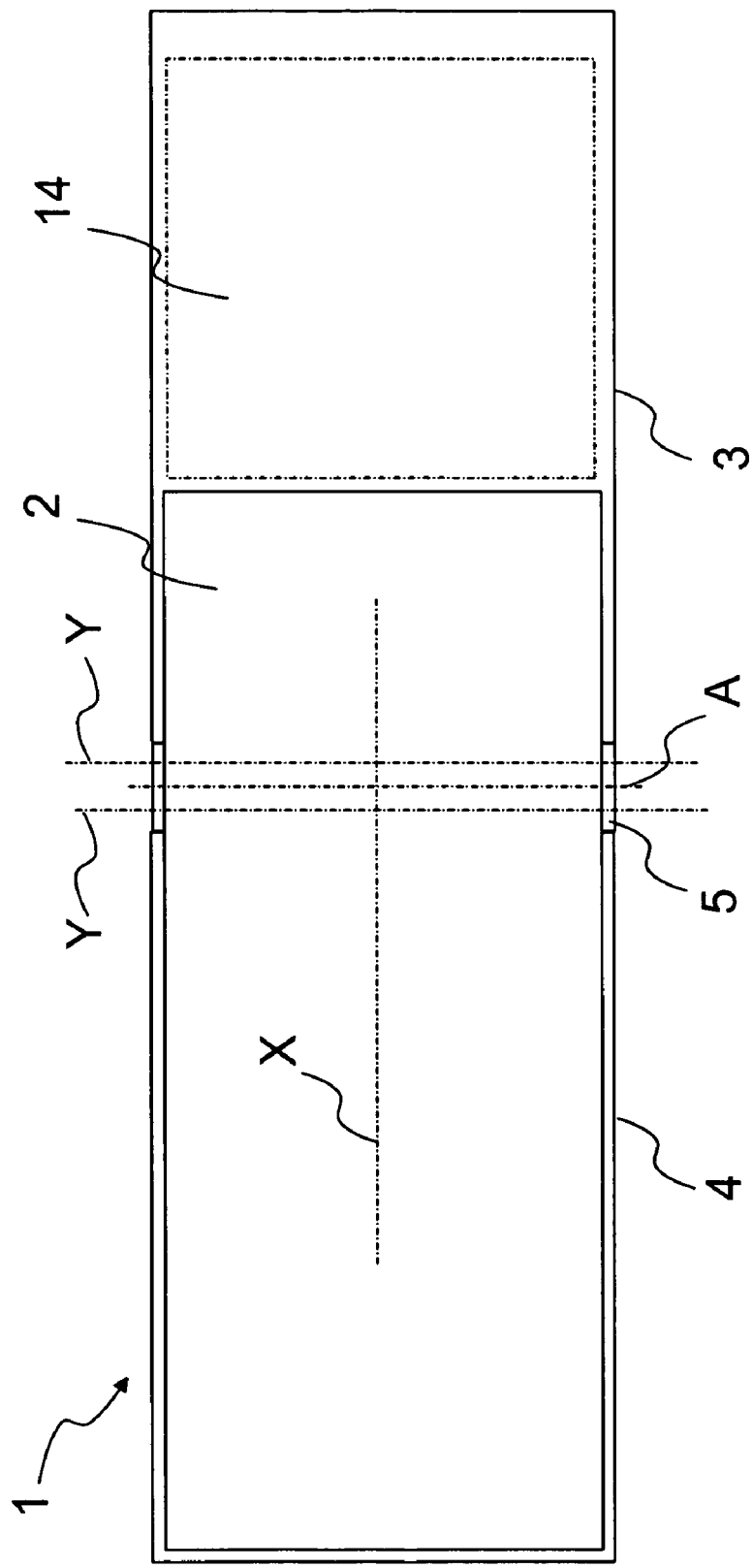

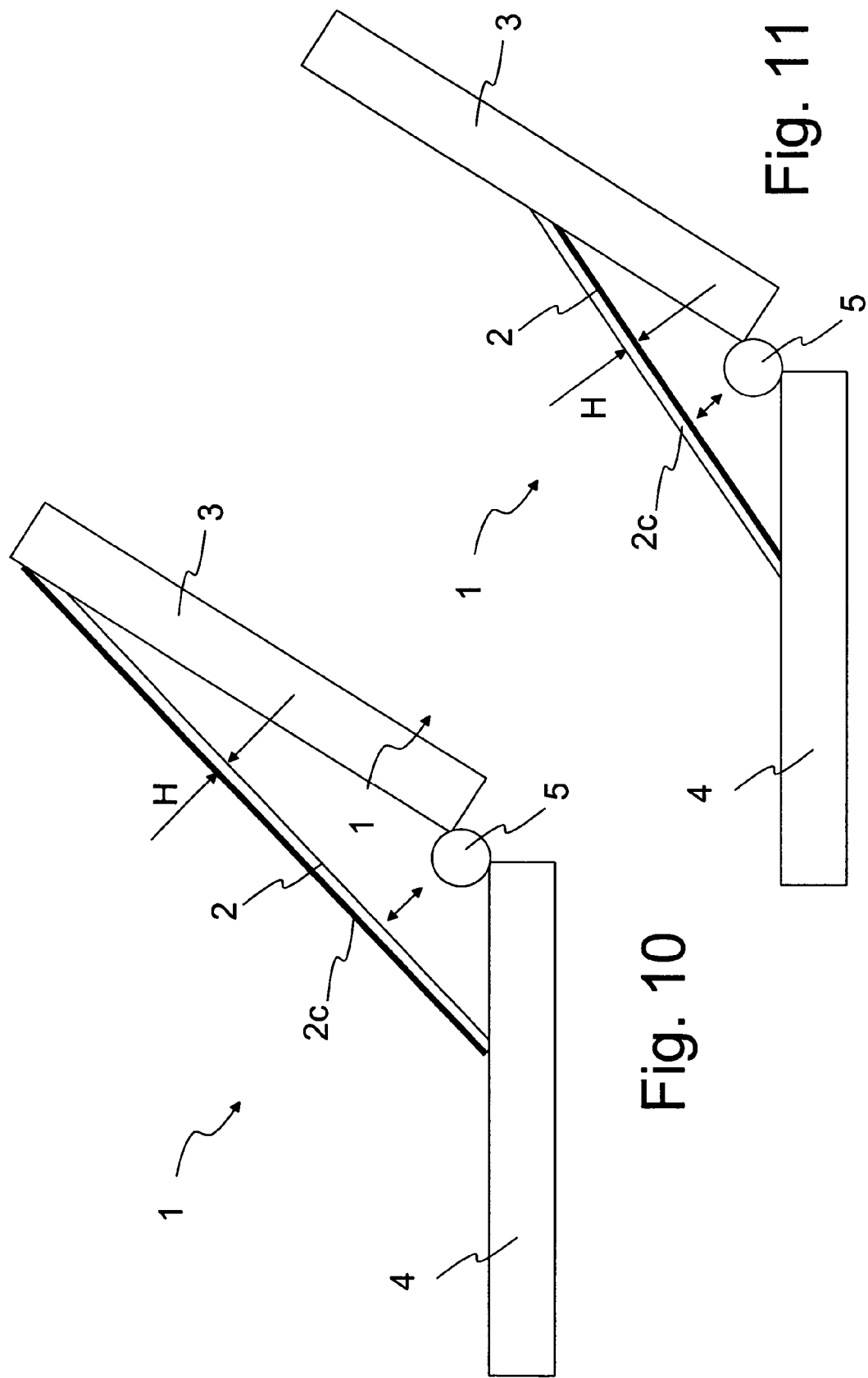

FOLDABLE ELECTRONIC DEVICE AND A FLEXIBLE DISPLAY DEVICE

TECHNICAL FIELD OF THE INVENTION

The invention relates to an electronic device. In addition, the invention relates to a flexible display device for an electronic device.

BACKGROUND OF THE INVENTION

The use of large area displays in foldable electronic devices is becoming increasingly interesting and this also creates growing interest towards different kinds of flexible display devices. Some solutions have been presented, inter alia, in U.S. Pat. No. 6,377,324, where the folding of a flexible display device has been taken into account; in U.S. Pat. No. 6,577,496, where the flexible display device is able to move; and in US 2004/0052044 A1, where a hinge system of an electronic device facilitates the flexing of a display device and the closing of the electronic device.

The manufacture, materials, structure and operation of flexible display devices are known as such in such respects how, for example, the structure allows the folding of a display device, as disclosed in US 2004/0159710 A1 and U.S. Pat. No. 6,016,176, or the rolling of a display device, as disclosed in U.S. Pat. No. 4,948,232, WO 2004/047059 A1 or US 2004/0061683 A1. The display device is based on, for example, LCD technique (Liquid Crystal Display) and they have been applied, inter alia, in mobile phones, as disclosed in WO 2004/001704 A1, US 2002/0090980 A1, U.S. Pat. No. 6,771,232 B2 or U.S. Pat. No. 6,311,076 B1.

In foldable electronic devices, such as wireless terminals, mobile phones and PDA devices (Personal Digital Assistant) the use of flexible display devices is problematic, when an integral display device is located twofold between the parts of an electronic device and covers the different parts of the opened electronic device. The electronic device is easy to close by folding the parts against each other, because the flexible display device may naturally tend to fold twofold. In the folded position said tendency is removed or decreases significantly, but in the open position of the electronic device, the above-mentioned effect may be directed towards the display device as a continuous tension. In addition to this, the phenomenon in question may limit the implementation possibilities of the electronic device, because its effect must be compensated in the construction of the hinge structure in order for the electronic device not to tend to close by itself. Lockings must possibly be added to the hinge or the device must be manually prevented from closing itself. Further, complex mechanical support arrangements are often required to ensure that the folding display remains flat and therefore easy to read when the device is opened.

SUMMARY OF THE INVENTION

The aim of the invention is eliminating said problems related to flexible display device and enabling their easy applicability in foldable electronic devices. By means of the flexible display device it is possible to utilize the folding point of the device or the area above the hinge as well for display purposes. By means of the invention, a display is also created, which is larger in area than an individual part of the electronic device. An example of an electronic device is a device composed of two or more foldable parts, which is, for example, a wireless terminal or a mobile phone, equipped possibly with personal data processing properties or data transfer properties.

According to one embodiment of the invention, the flexible display device has one or more states, which is represented by a preferred position or form, which the flexible display device tends to set itself to. In one embodiment the flexible display device naturally tends to remain open in a position where it covers as wide as possible an area. At the same time, the display device is curved in a direction that is substantially perpendicular to such a direction where the flexible display device itself tends to fold to or to where it is folded twofold. The display device according to the invention deviates from a rolling type display, instead it merely tends to fold. Advantageously the display device has two states, which it tends to prefer: the above-mentioned curved and rigid position and a position where the profile of the display device is straight but twofold. Thus, the display device has two states, where the prevailing tensions are different. The curved position occurs in different embodiments either as a concave or a convex state, where said cross-sectional shape of the display foil also stiffens up the display structure. According to an embodiment, in the case of a foldable electronic device, the flexible display device tends, at least at the swivel or the possible hinge of the device to fold twofold into a closed position. The tendency to move to a curved open position also occurs at the corresponding point. According to an embodiment, the tendency to move to a curved position is invoked by an external stimulus. In an embodiment, the stimulus is achieved by means of an organ or body placed in the electronic device, which is controlled mechanically or electrically. In an embodiment the above-mentioned organs also assist in straightening the display device for the folding.

In some embodiments the opposite ends of the flexible display attach to two adjacent parts of the electronic device. The parts of the device are moved to an angular position and the flexible display straightens between them, in which case a display is created, which is larger in area than an individual part.

BRIEF DESCRIPTION OF THE DRAWINGS

In the following, the invention will be described in more detail with reference to the appended drawings, in which FIG. 1 shows a foldable electronic device in a closed position and a folded flexible display device, FIG. 2 shows the foldable electronic device of FIG. 1 in an open position and a curved flexible display, FIG. 3 shows a top view of the foldable electronic device of FIG. 1 in an open position and its uncovered hinge structure, FIGS. 4 & 5 show end views of the foldable electronic device of FIG. 1 in an open position and a curved flexible display, FIG. 6 shows a top view of a foldable electronic device in an open position and its uncovered hinge structure, FIGS. 7 & 8 show end views of a foldable electronic device in an open position and a curved flexible display, FIG. 9 shows a top view of a foldable electronic device in an open position and a flexible display device assembled to it, FIGS. 10 & 11 show side views of a foldable electronic device in an open position and a curved flexible display.

DETAILED DESCRIPTION OF THE INVENTION

Figure 15:
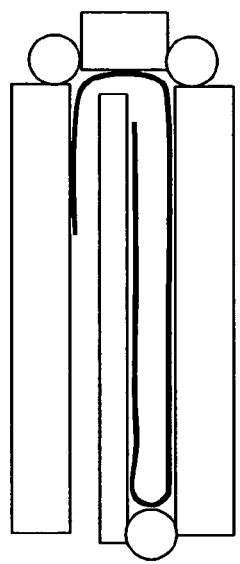
FIGS. 12 to 16 show side views of a foldable electronic device in a closed position and a folded flexible display.

The electronic device 1 shown in the figures is shown in such respects that are necessary for visualizing the invention.

The electronic device applies technique known as such for the part of its internal structure and operation, which is characteristic to, for example, a mobile phone and a PDA device or a combination of them, a wireless terminal or other portable device for wireless data transfer. In the following description, the elements of the electronic device shown in the figures will be discussed. The flexible display device 2 shown in the figures is shown in such respects that are necessary for visualizing the invention. The flexible display device applies technique known as such in its structure, materials and electric operation, which is characteristic to, for example, a flexible LCD display. As such, the invention is applicable for use in connection with any flexible display, which display may be self-emissive, as examples of which can be mentioned organic electroluminence display and organic light emitting diode display (OLED), or non-emissive (reflective display), as an example of which can be mentioned electrophoretic display. Couplings between the display 2 and the device 1 and control manners known as such are applied for showing information on the display 2. In the case of a wireless terminal the data transfer and equipment according to the selected specification is applied. In the following description are disclosed those elements of the flexible display device that are characteristic to the invention and for the application of the flexible display device in a foldable electronic device.

In FIGS. 3 and 6 the location 2 of the display is presented only by means of a dashed line in order to better display the hinge structure 5 that typically remains under the display 2.

Figure 16:
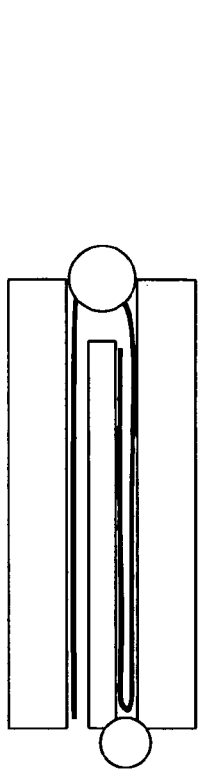
Figure 17:
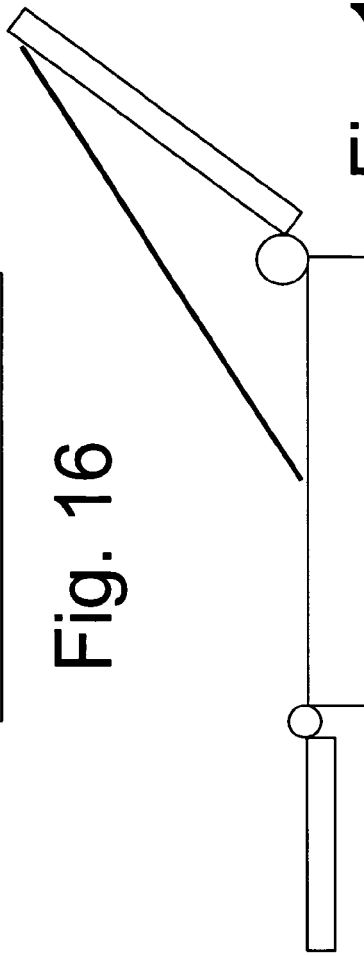
FIG. 17 shows a side view of a foldable electronic device in an open position and a curved flexible display.
Figure 12:
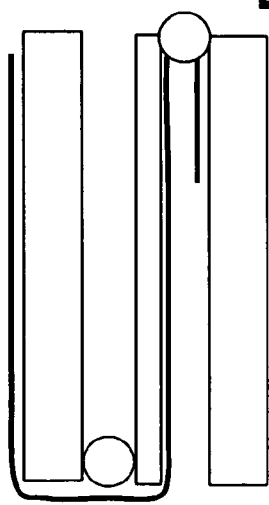
Figure 13:
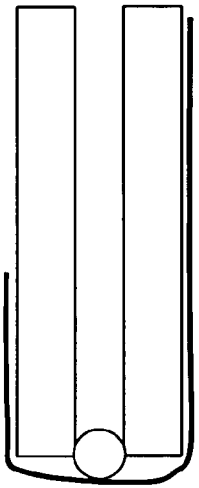
Figure 14:
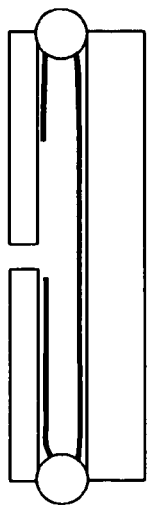

The electronic device comprises at least two parts foldable in relation to each other, which can be turned to different operating positions. The foldable electronic device according to FIG. 1, i.e. device 1, comprises two parts 3 and 4 positioned against each other, between which is a hinge structure 5, which takes care of folding the parts 3 and 4 to a closed position according to FIG. 1, which represents a first position, and to an open position according to FIG. 2, which represents a second position. In FIG. 9 is marked an axis line A, around which the part 3 rotates over part 4, and which is implemented by means of a hinge 5. The exact placement of the hinge 5 of FIG. 1 may also vary from what is shown. It is also possible to select as a hinge a structure that does now extend significantly over the parts 3 or 4, as in FIG. 9. The hinge 5 shown in FIG. 2 does not allow the parts 3 and 4 to diverge from each other, and therefore a space for the display area 2c and the fold is arranged in the hinge 5 according to FIG. 1. When the hinge allows the movement between parts 3 and 4, mainly divergence, then when the device 1 is being closed, the space in question is not necessary. Alternatively, the display 2 is attached to the device 1 in such a manner that it can move at least in the direction X of FIG. 9, and also in direction Y, if necessary. Thus, the display 2 is placed, for example, under the frame circulating the device 1. In an embodiment according to FIG. 9, the display 2 is attached from its edges over the parts 3 and 4, in which case at least the central part of the display 2 can freely move to a curved position. In other words, such a set up allows the effective length of the display to change when the display is folded in a closed position. Even if the display is manufactured flexible, it typically cannot elongate in the direction of the plane of its sheet-like structure. The display 2 covers two or more parts of the device 1, either entirely or partly. The area 14 in part 3 remaining free in the embodiment of FIG. 9 can be equipped, for example, with a keyboard or other parts (organs) necessary from the point of view of the user interface of the device 1. In a corresponding manner, the upper part of part 4 can be left free. The display extends over one or more hinge structures, such as shown in the embodiments of FIGS. 12 to 17.

In an embodiment according to FIG. 1 a flexible display device, i.e. the display 2 extends seamlessly to the areas of both parts 3 and 4, and especially over the hinge 5. The display 2 covers the hinge 5 and parts 3 and 4 at least partly. According to FIG. 2 the display 2 forms one large area, integral surface where it is possible to display graphics, text or symbols necessary from the point of view of the user interface. The information can be shown on the display 2 in at least one orientation, which corresponds to the lateral direction of the device 1 (corresponding to the direction Y of FIG. 9) or the longitudinal direction (corresponding to direction X of FIG. 9). The display 2 is referred to by using the display area 2a, which moves along the part 3 or is attached to it; the display area 2b, which moves along the part 4 or is attached to it; and display area 2c, which is located at the fold of parts 3 and 4, i.e. at the hinge 5. The display area 2c is mainly that part of the display 2, which folds in the position according to FIG. 1, and thus it is seen that the folding of the display 2 in the X-direction (i.e. the tendency towards the position according to FIG. 1) can be limited to the display area 2c and even then the device 1 can be opened and closed.

In the open position of the display 2 and the device 1, the display 2 is curved in its shape in a direction that corresponds to the lateral direction of the device (corresponding to the direction Y of FIG. 9). The display 2 aims to the position according to FIG. 2 by itself and to remain there. The position of FIG. 2 thus corresponds to the position of the display 2, to which it naturally aims, for example, by means of the inner tension created during its manufacture. It is a type of an initial tension, which affects the display 2. The effect can be visualized, for example, by means of a paper sheet or a metal plate first rolled closed and then rolled open. The sheet or plate tends to remain in a curved position or even to roll back into a roll, depending on its structure.

The effect is created, for example, in such a manner that some structural layer of the display 2 is either entirely or partly equipped with said property, or the display 2 comprises a thin, elastic and resilient metal plate, which is attached to the display 2. The effect is created, for example, in such a manner that the display 2 or some of its structural layers is manufactured as curved by its form. An initially tense, curved form is also created by means of a curved mould and thermal treatment. The curved form is created in a thin metal plate by rolling by means of rollers. The preferred form is created also by stiffening. The height H of the profile of the display 2 in a curved position is thus greater than the thickness of the display 2 itself, which, in turn, is the same as the height of the profile of the display 2 in the position of FIG. 1. The metal plate is visualized with the layer 2d of FIG. 2, which is laminated into the display 2. The layer 2d extends to the entire area of the display 2 in the embodiment of FIG. 2, but in an embodiment the layer 2d is located only in the central area of the display 2, covering a long but narrow area, extending from one end of the display 2 to the other, if necessary. The layer 2d is visualized with a line of dots and dashes in FIG. 6. In an embodiment the display 2 comprises two or more separate layers 2d, which settle symmetrically on the longitudinal axis of the device 1, covering a long but narrow area.

Generally the display 2 requires an external stimulus or force, by means of which it transfers more easily to the curved and at the same time stiffened position according to FIG. 4 or FIG. 8. In said curved and stiffened position, when observed from above, despite the curvature the display appears to be substantially flat and is therefore easy to read. In the figures the curvature of the curved mode is somewhat exaggerated to more clearly express the stiffening effect. An external stimulus is not necessary if the display 2 can move by itself to the curved position according to FIG. 4 or FIG. 8 in a situation where the positions of parts 3 and 4 of the device 1 of FIG. 2 differ from each other by approximately 180° and the display 2 is completely open and substantially flat, corresponding to, for example, the form of the display part 2a or 2b of FIG. 1 in its profile.

The display 2 itself is completely open in the embodiments of FIGS. 10 and 11 as well, wherein the angle of the parts is less than 180°. The display is attached at its ends to two different parts or blocks of the device and when the device is opened, the display 2 straightens from a folded position, which corresponds to FIG. 1, and moves to a curved position by itself or as a consequence of a given stimulus. In the position of FIGS. 10 and 11 the display 2 forms an angle in relation to parts 3 and 4 of the device 1. The display 2 and the parts 3, 4 form a structure in the shape of a triangle. The display 2 is in a suitable angle in relation to the user. If necessary, the device can comprise further blocks in the manner of FIG. 17. The display 2 extends over at least two parts of the device 1, covering them at least partly. For example, in FIG. 10 the area in part 4 remaining free can be equipped with, for example, a keyboard or another type of user interface device.

In the embodiment of FIG. 3 the stimulus is achieved with an organ or part 6 attached to the hinge 5, which organ rises above the surface of the part 3 and/or part 4. The organ 6 moves while the device 1 is opened and the hinge 5 is in operation. The organ 6 forces the display 2 to rise and launches the tendency of the display 2 to curve to a convex form according to FIG. 4. In an embodiment the position of organ 6 is fixed in relation to part 4, but during the opening of the device 1 the display 2 descends or tightens over the organ 6 in such a manner that the organ 6 forces the display 2 to the curved mode.

The embodiment of FIG. 6 also shows an organ 6, but now it is attached to a mechanism 7, which moves the organ 6 and in this case is connected to the hinge 5. The position of the mechanism 7 depends either on the position of the hinge 5, or the organ 6 is launched to the position according to FIG. 4 by means of it. The launching can be initiated manually, for example, by means of a push-button 10 placed in the hinge 5 or part 3.

FIG. 6 shows an organ 8, which is a pin, which performs an operation corresponding to the organ 6. Two pins 8 are drafted in FIG. 6, which are placed in part 4 (and/or part 3) and which take care of launching the display to a curved position. One or more pins 8 are placed on the central line of the device 1 (corresponding to the direction X of FIG. 9). The pin 8 or organ 6 can also be located somewhere else than the central line, as long as it is located in the area 2d, preferably in the middle of it or on its central line.

The position of the pin 8 depends either on the position of the hinge 5 in the same manner as the organ 6, or it is launched at the desired moment to the position according to FIG. 7. The launch can be initiated manually, for example, by means of a push-button 12 placed in part 3 in the manner of the push-button 10. The pin 8 can be pushed out and pulled in also via a controlled and electrically operating actuator 9 (see FIGS. 7,8). The actuator 9 is launched either by the above-mentioned push-button 12 and/or based on a signal depending on the position of the hinge. For this purpose, the device 1 comprises a detector 11, if necessary, which provides information on the position of the device 1. The organ 6 and the pin 8 operate preferably at that moment when the device 1 or the hinge 5 reach the position according to FIG. 2.

In an embodiment the display 2 is attached to the organ 6 or the pin 8. In the situation according to FIG. 7 the display 2 can now be pulled straight before folding the device 1 or during it, and therefore the curved position does not prevent the device 1 and display 2 from moving to the folded position according to FIG. 1. The pulling is actuated either manually, for example, by means of a push-button, or on the basis of a signal provided by the detector 11. The detector 11 detects when the device 1 is being closed. Alternatively, according to FIG. 5, the display is stretched straight for folding by means of either one or more organs 13. The organ attaches to the display 2, either on one or both sides of it, and pulls it in the direction Y, for example, by means of an actuator. The operation of the organ 13 can also be arranged to depend on a hinge 5, a detector 11 or a push-button 19 as discussed above.

In the embodiment according to FIG. 8, the display 2 tends to curve into a concave form, in which case, if necessary, the stimulus is created by pulling the display 2 into curved form towards the device 1. The display 2 is thus attached to the organ 6 or the pin 8. Correspondingly, for folding the device 1 the display 2 is straightened by active measures, which is possible by pushing the possible organ 6 or pin 8 upwards. A detector 11, an actuator 9 and a push-button 12 are utilized, if necessary, as already discussed above. The operation of the pulling organ 6 may depend on the operation of the hinge 5, as discussed above, in which case the organ 6 pulls inwards when opening the device 1, and utilizes the mechanism 7 and the push-button 10, if necessary. The folding of a concave display 2 in such a manner that the concave sides settle against each other is often easier, and therefore active straightening is not essential. The pin 8 can be arranged for the stimulus to perform only a short pulling movement and to release after that.

FIG. 9 shows the direction X more closely, which is transverse in relation to the direction Y, which is parallel to the axis line A. The device 1 folds around the axis line A. The display 2 tends to curve into either a convex or concave form in respect of/around the direction X. If necessary, the curved form extends over the entire length of the display 2. There is at least one point on the display 2, which tends to fold twofold around the direction Y. The point in question is preferably the display area 2c. The display areas 2a and 2b do not need to fold around the direction Y and they are settled against parts 3 and 4. The profile of the display area 2c must also be straight before it can be folded twofold. When the profile of the display area 2c is straight, it can, if necessary, itself aim towards a folded position, which is its other preferred form. The curved form of the area 2c, whether convex or concave, cancels and prevents the tendency in question.

FIGS. 12 to 17 show other embodiments of an electronic device and a flexible display, where the electronic device comprises two or more foldable parts, which in different configurations fold in relation to each other. The positions of the electronic device in FIGS. 12 to 16 correspond to the closed position. In these embodiments the parts have parallel rotation axes and they are located sequentially. Additional parts can also be attached to the parts shown in the figures, for example, for a keyboard or other organs of the user interface. The rotation axles of these additional parts are typically perpendicular or angular in relation to the rotation axles of the parts in FIGS. 12 to 17. In the devices of FIGS. 12 to 16, solutions disclosed above, for example, in connection with FIGS. 4 to 8, are applied. The flexible display extends over the area of two or more parts, covering it either entirely or partly. The display comprises one or more points where it tends to fold twofold, either in the same direction as in FIGS. 14 to 16, or to different directions, as in FIG. 12. In the embodiments of FIGS. 12 to 17 the display is convex or concave.

The invention is not limited solely to the examples presented above, but it may vary within the scope of the appended claims.

What is claimed is:

1. An electronic device comprising:
   at least two parts foldable in relation to each other between a first position and a second position around a rotation axis,
   a flexible display device, which extends over at least said two said foldable parts, covering them either entirely or partly, wherein said flexible display device comprises:
   a folded position, to which said flexible display device settles in said first position, and in which said flexible display device folds around a first direction, wherein said first direction is parallel in relation to said rotation axis; and
   a curved position, to which said flexible display device settles in said second position, and in which said flexible display device curves around a second direction, wherein said second direction is transverse in relation to said rotation axis, wherein said curved position is an open position of said flexible display device to which said flexible display device tends to move and in which said flexible display device tends to remain when said electronic device is in said second position.

2. The electronic device according to claim 1, wherein the display device in addition folds around a third direction, which is parallel in relation to said rotation axis.

3. The electronic device according to claim 1, wherein said curved position is a preferred position, to which said display device tends to move by itself and to remain there.

4. The electronic device according to claim 3, wherein the electronic device further comprises at least one organ, which is arranged to provide a stimulus to said display device in order for it to move to said preferred position.

5. The electronic device according to claim 1, wherein said curved position is either convex or concave.

6. The electronic device according to claim 1, wherein the electronic device further comprises at least one organ, which is arranged to either push or pull said display device to said curved position.

7. The electronic device according to claim 1, wherein the electronic device further comprises at least one organ, which is arranged to either pull or push said display device from said curved position to a straightened position, wherein folding said display device is possible.

8. The electronic device according to claim 1, wherein the electronic device further comprises a hinge structure and wherein said flexible display device extends over said hinge structure.

9. The electronic device according to claim 1, wherein the electronic device further comprises a hinge structure, to which is placed at least one organ, which is arranged to provide a stimulus to said display device in order for it to move to said folded position and/or to said curved position.

10. The electronic device according to claim 1, wherein the electronic device further comprises at least one electrically operating actuator, which is arranged to either push or pull said display device to said curved position.

11. The electronic device according to claim 1, wherein at least one said foldable part is settled between said display device when said display device is in said folded position.

12. The electronic device according to claim 1, wherein at least one said foldable part is settled between two said foldable parts when said parts are in said first position.

13. The electronic device according to claim 1, wherein at least two said foldable parts are settled sequentially when said parts are in said second position.

14. The electronic device according to claim 1, wherein the angle between two said foldable parts is less than 180° and said flexible display is settled in said curved position over them and angled in relation to them.

15. The electronic device according to claim 14, wherein said electronic device is a wireless terminal or a mobile phone.

16. A flexible display device for an electronic device comprising:
   a folded closed position, to which said flexible display device folds around a first direction, wherein said first direction is parallel in relation to a rotational axis of the electronic device when said electronic device is in a first position, and
   a curved open position, to which said flexible display device curves around a second direction, wherein said second direction is transverse in relation to said rotation axis, wherein said curved open position is an open position of said flexible display device to which said flexible display device tends to move and in which said flexible display device tends to remain when said electronic device is in a second position.

17. The flexible display device according to claim 16, wherein said curved position is a preferred position, to which said display device tends to move by itself and to remain there.

18. The flexible display device according to claim 17, wherein said folded position is also a preferred position, to which said display device tends to move by itself and to remain there.

19. The flexible display device according to claim 16, wherein said flexible display device is in said folded position folded twofold.

20. The flexible display device according to claim 16, wherein said flexible display device is arranged for an electronic device, which comprises at least two parts foldable in relation to each other and around a rotation axis, wherein said flexible display device is arranged to extend over at least two foldable parts of said electronic device, covering them either entirely or partly.

* * * * *